(12) United States Patent
Baglini, Jr.

(10) Patent No.: US 9,945,488 B2
(45) Date of Patent: Apr. 17, 2018

(54) MECHANICALLY-ACTIVATED INFLATION VALVE ACTUATION APPARATUS

(71) Applicant: Goodrich Corporation, Charlotte, NC (US)

(72) Inventor: James Baglini, Jr., Chandler, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 123 days.

(21) Appl. No.: 14/937,451

(22) Filed: Nov. 10, 2015

(65) Prior Publication Data

US 2017/0130851 A1  May 11, 2017

(51) Int. Cl.

| | |
|---|---|
| *F16K 31/163* | (2006.01) |
| *F16K 15/20* | (2006.01) |
| *B64D 25/14* | (2006.01) |
| *F16K 31/60* | (2006.01) |
| *F15B 15/19* | (2006.01) |
| *F42B 3/04* | (2006.01) |
| *F42B 3/00* | (2006.01) |
| *C06C 7/00* | (2006.01) |
| *F42B 3/10* | (2006.01) |
| *F42C 19/10* | (2006.01) |

(52) U.S. Cl.
CPC .............. *F16K 15/20* (2013.01); *B64D 25/14* (2013.01); *F15B 15/19* (2013.01); *F16K 31/1635* (2013.01); *F16K 31/602* (2013.01); *F42B 3/006* (2013.01); *F42B 3/04* (2013.01); *C06C 7/00* (2013.01); *F42B 3/10* (2013.01); *F42C 19/10* (2013.01)

(58) Field of Classification Search
CPC ....... F16K 15/20; F16K 31/602; B64D 25/14; B63B 7/00; B63C 9/00; G05D 13/02; F15B 15/19; F42B 3/04; F42B 3/006; F42B 3/10; F42C 19/10
USPC ......... 137/68.13, 513, 910; 251/213, 89, 90, 251/96, 98, 99, 292, 315.01, 315.06
See application file for complete search history.

(56) References Cited

U.S. PATENT DOCUMENTS

| | | | | | |
|---|---|---|---|---|---|
| 2,531,263 | A | * | 11/1950 | Fink | .......................... B64C 1/24 105/447 |
| 3,633,853 | A | * | 1/1972 | Collins | ................... B64D 25/14 182/48 |
| 3,663,035 | A | * | 5/1972 | Norton | ..................... B60R 21/20 102/531 |
| 3,820,607 | A | * | 6/1974 | Milley | ................. A62C 13/003 169/26 |
| 3,869,315 | A | | 3/1975 | Dolgner | |

(Continued)

FOREIGN PATENT DOCUMENTS

GB    1207422    9/1970

OTHER PUBLICATIONS

Extended European Search Report dated Apr. 10, 2017 in European Application No. 16197608.9.

(Continued)

*Primary Examiner* — Minh Le
(74) *Attorney, Agent, or Firm* — Snell & Wilmer, L.L.P.

(57) ABSTRACT

A valve actuation apparatus is provided. The apparatus may comprise a mechanical activation device, a primer, an explosive cord, and a gas-generating device. The valve actuation apparatus may actuate a valve system, which opens a valve and allows airflow to inflate an inflatable emergency evacuation slide for an aircraft.

19 Claims, 6 Drawing Sheets

(56) References Cited

U.S. PATENT DOCUMENTS

| | | | |
|---|---|---|---|
| 4,328,753 A | 5/1982 | Kristensen et al. | |
| 4,436,159 A * | 3/1984 | Revay | A62C 35/08 137/68.13 |
| 4,688,466 A * | 8/1987 | Burkdoll | F42C 7/12 102/261 |
| 4,715,562 A * | 12/1987 | Bokalot | B64C 1/1407 244/137.2 |
| 5,010,821 A * | 4/1991 | Blain | F42D 1/043 102/275.5 |
| 5,286,053 A * | 2/1994 | Lenzen | B60R 21/33 102/275.2 |
| 5,555,839 A * | 9/1996 | Staten | B63C 9/00 116/209 |
| 5,820,162 A * | 10/1998 | Fink | B60R 21/205 137/68.13 |
| 6,131,949 A | 10/2000 | Lewis et al. | |
| 6,206,337 B1 * | 3/2001 | Veillet, Jr. | F16K 31/06 137/78.1 |
| 6,240,951 B1 | 6/2001 | Yori | |
| 6,382,232 B1 * | 5/2002 | Portmann | F16K 13/06 102/275.1 |
| 6,601,516 B2 | 8/2003 | Harrington et al. | |
| 6,752,356 B2 * | 6/2004 | Baderspach | B64C 1/1407 244/129.5 |
| 7,490,795 B2 * | 2/2009 | Clegg | B64D 25/14 137/587 |
| 7,536,818 B1 | 5/2009 | Margiotta | |
| 8,066,108 B2 * | 11/2011 | Hentges | A62B 1/20 182/48 |
| 2004/0195457 A1 | 10/2004 | Baker et al. | |
| 2008/0042407 A1 | 2/2008 | Gibbons | |
| 2017/0016297 A1 * | 1/2017 | Grattan | E21B 29/02 |

OTHER PUBLICATIONS

EP Extended Search Report dated Jul. 28, 2017 in European Application No. 16197608.9.

* cited by examiner

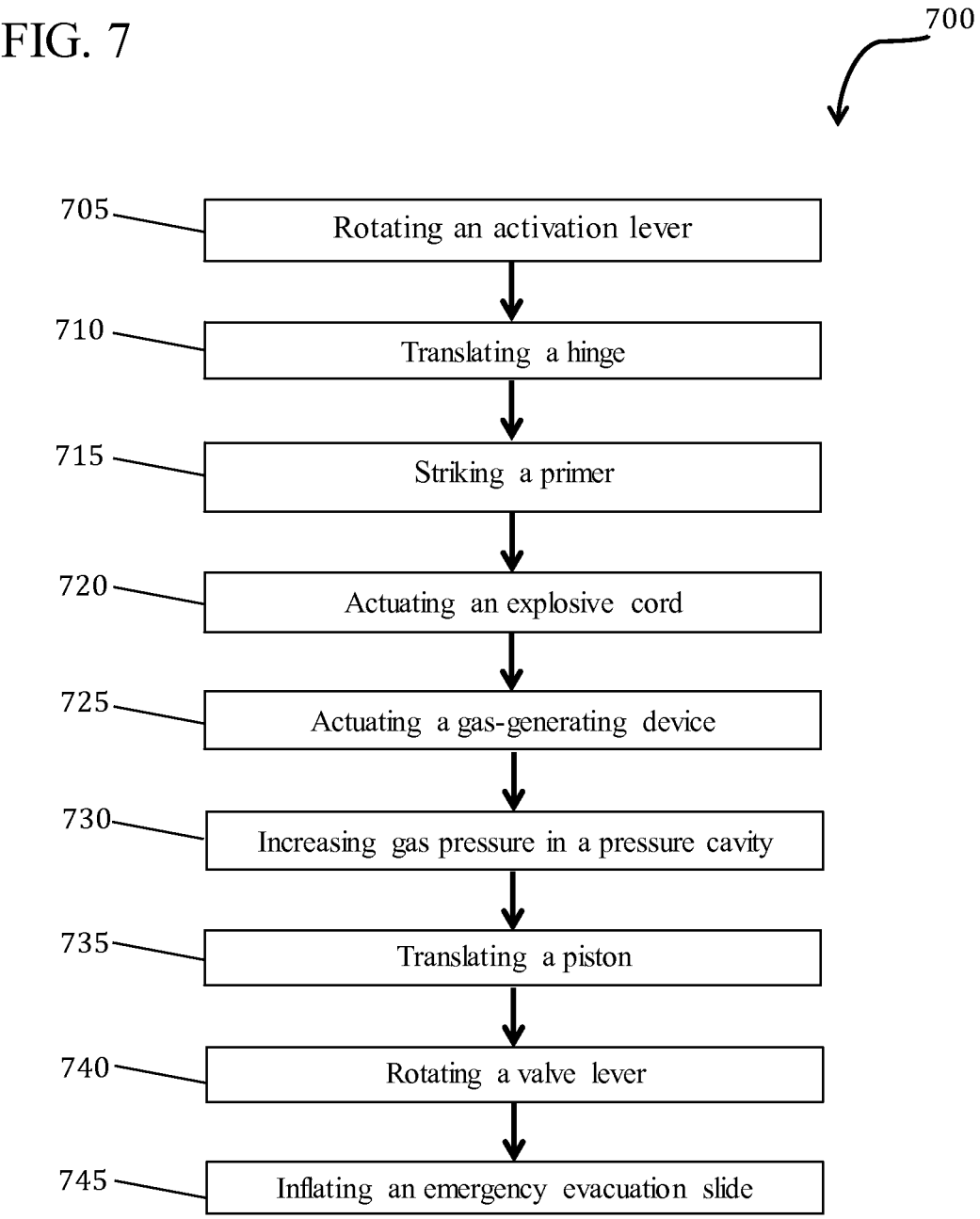

MECHANICALLY-ACTIVATED INFLATION VALVE ACTUATION APPARATUS

FIELD

The present disclosure relates to a mechanically-activated actuation apparatus.

BACKGROUND

Squibs may be used to perform work, such as actuating a valve in an emergency device. An example of an emergency device coupled to a valve is an emergency evacuation slide, which may be used to exit an aircraft absent a jet way or other means of egress for passengers. When triggered by an electric current in an emergency, the energetic material within the squib deflagrates, providing the force needed to activate an inflation valve actuation apparatus, which in turn, opens the valve so air can flow and inflate the evacuation slide. These devices typically comprise an electrical power source in order to be reliably actuated, which can lead to complex, expensive circuitry and mechanical structures.

SUMMARY

The present disclosure provides an apparatus for deflagration-driven actuation. For example, an inflation valve that is deflagration-driven may be coupled to an inflatable emergency evacuation slide of an aircraft.

According to various embodiments, an inflation valve actuation apparatus may comprise a mechanical activation device, a primer coupled to the mechanical activation device configured to deflagrate upon activation by the mechanical activation device, an explosive cord, comprising an explosive cord first end coupled to the primer, an explosive cord second end, and an explosive cord reactive material, wherein the explosive cord reactive material is configured to detonate upon ignition from the primer and send a pressure wave and hot gas through a length of the explosive cord, and a gas-generating device coupled to the explosive cord second end configured to be activated by the hot gas from the explosive cord and, in response to the hot gas, produce gas. In various embodiments, the mechanical activation device comprises an activation lever, a hinge coupled to the activation lever, and a percussion actuator coupled to the hinge.

In various embodiments, the percussion actuator may comprise, an outer shell comprising an inbound end and an outbound end, an outer rod coupled to the inbound end, comprising an outer rod first end coupled to the hinge and an outer rod second end, configured to move in a cocking direction when the hinge moves in an actuating direction, an actuating rod contained within the outer shell, comprising an actuating rod first end removably coupled to the outer rod second end, and an actuating rod second end, the actuating rod being configured to move with the outer rod in the cocking direction to a sever point, and at the sever point the actuating rod is configured to decouple from the outer rod, a spring coupled to the actuating rod, the spring being configured to store potential energy as the actuating rod moves in the cocking direction, and at the sever point, release the stored potential energy into kinetic energy in a striking direction, which moves the actuating rod in the striking direction, and a pin coupled to the actuating rod first end.

In various embodiments, the valve actuation apparatus may comprise a valve system activation apparatus comprising a mechanical activation device and a gas generating device coupled to the mechanical activation device, and a valve system coupled to the gas-generating device, comprising a pressure chamber, comprising a pressure chamber first end coupled to the gas-generating device, a pressure chamber second end, and a pressure cavity therebetween configured to receive gas produced by the gas-generating device creating a gas pressure, a piston coupled to the pressure chamber configured to translate along an axis in response to the gas pressure in the pressure cavity, a valve lever in a valve lever closed position proximate to the piston, the valve lever being configured to be pushed into a valve lever open position by the piston as the piston translates along the axis in response to the gas pressure, and a valve coupled to the valve lever.

In various embodiments, the valve actuation apparatus may comprise an inflatable emergency evacuation slide for an aircraft configured to inflate upon activation of the inflation valve actuation apparatus.

In various embodiments, a method of actuating a valve actuation apparatus may comprise rotating an activation lever, translating a hinge, striking a primer, actuating an explosive cord, actuating a gas-generating device. The method of actuating a valve actuation may further comprise increasing gas in a pressure cavity, translating a piston, and rotating a valve lever. The method of actuating a valve actuation apparatus may further comprise inflating an inflatable emergency evacuation slide for an aircraft in response to the valve lever rotation to the valve lever open position The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 7 is a block diagram illustrating an exemplary method of actuating a valve actuation apparatus, in accordance with various embodiments.

DETAILED DESCRIPTION

The detailed description of exemplary embodiments herein makes reference to the accompanying drawings, which show exemplary embodiments by way of illustration.

While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
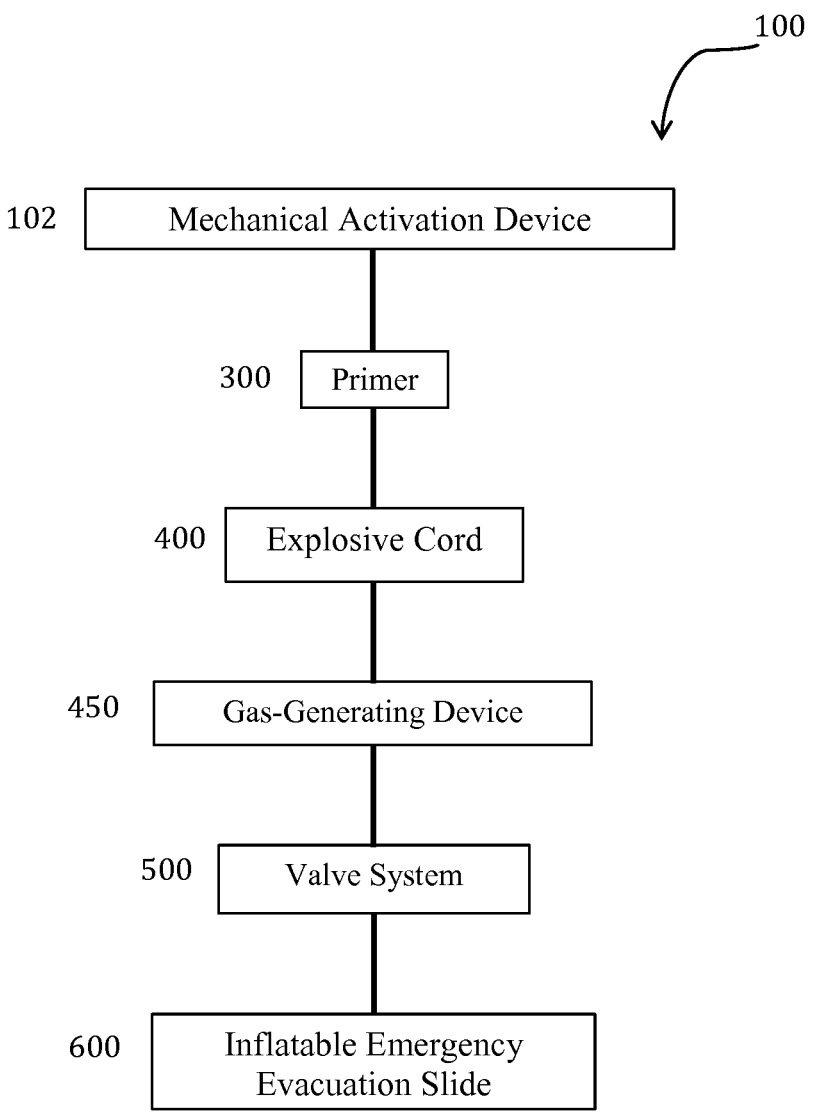
FIG. 1 illustrates a block diagram of a valve actuation apparatus.

With reference to FIG. 1, in various embodiments, a valve actuation apparatus 100 may comprise a mechanical activation device 102, a primer 300, an explosive cord 400, a gas generating device 450, a valve system 500, and an inflatable emergency evacuation slide 600.

Figure 2:
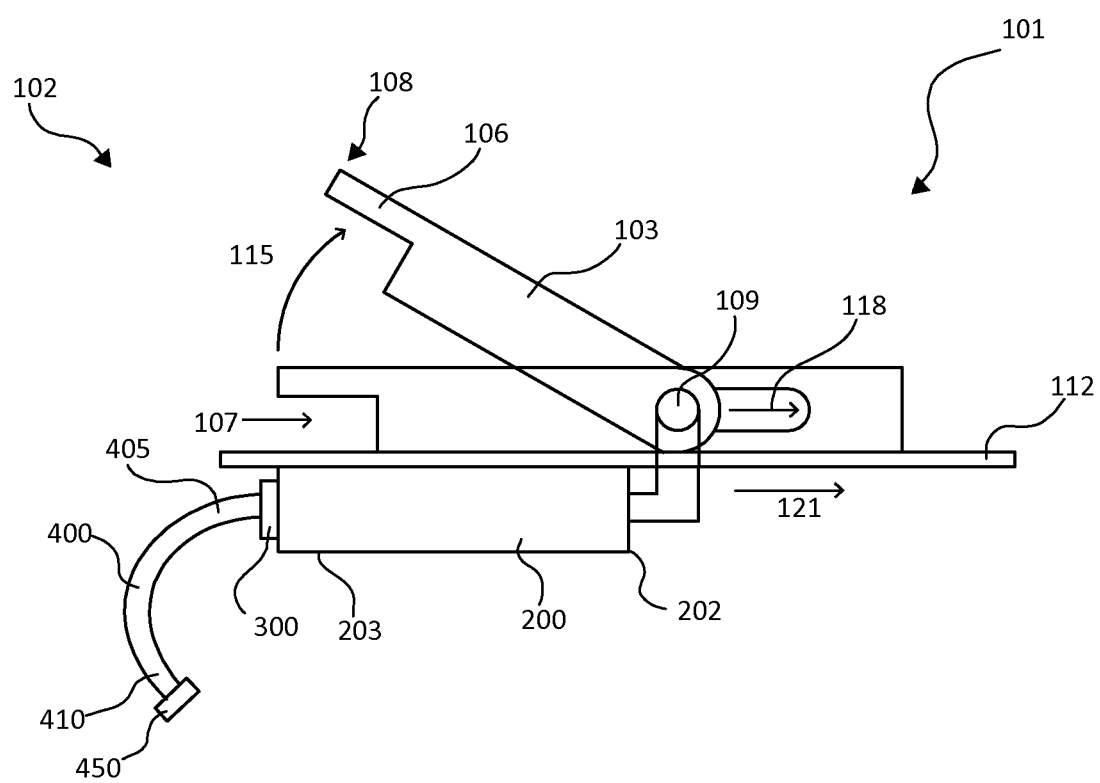
FIG. 2 illustrates an exemplary valve system activation apparatus, in accordance with various embodiments.

With reference to FIG. 2, a valve system activation apparatus 101 is shown comprising a mechanical activation device 102, a primer 300, an explosive cord 400, and a gas-generating device 450, in accordance with various embodiments. The mechanical activation device 102 may comprise an activation lever 103, a hinge 109, a foundation 112, and a percussion actuator 200. The activation lever 103 may be coupled to the hinge 109, and the hinge 109 may be coupled to the foundation 112. The percussion actuator 200 may also be coupled to the foundation 112. In various embodiments, hinge 109 may be coupled to the foundation 112 on a side of the foundation 112 that is opposite to a side of the foundation 112 to which the percussion actuator 200 is coupled. In various embodiments, the hinge 109 and percussion actuator 200 may be coupled to the foundation 112 on the same side of the foundation 112 and may be adjacent to one another, or may be in any other suitable arrangement.

In various embodiments, the activation lever 103 may be a beam comprised of metal or any other suitable material, and may be configured to move from an unarmed position 107 to an armed position 108. To move from the unarmed position 107 to the armed position 108, the activation lever 103 may be pushed or pulled by man or machine in an arming direction 115. The arming direction 115 may be a rotational direction about a point, such as the hinge 109, or the arming direction 115 may be a translational direction along an axis. In order to manually move the activation lever 103 from the unarmed position 107 to the armed position 108, the activation lever 103 may include a handle 106 to allow easier gripping for a user.

In various embodiments, the hinge 109 is coupled to the activation lever 103 and may be a rotational hinge which would allow the arming direction 115 to be a rotational direction. In various embodiments, hinge 109 may be a device that allows the arming direction 115 to be a translation along an axis.

In various embodiments, after the activation lever 103 is moved in the arming direction 115 from the unarmed position 107 to the armed position 108, the hinge 109 is able to move in an actuating direction 118. The actuating direction 118 may be a translation along an axis, a movement along a curve, a rotational movement, or any other movement that would allow the actuation of the primer 300. In various embodiments, the actuating direction 118 may be a different direction or movement than the arming direction 115, or the actuating direction 118 may be the same direction or movement as the arming direction 115.

Figure 3A:
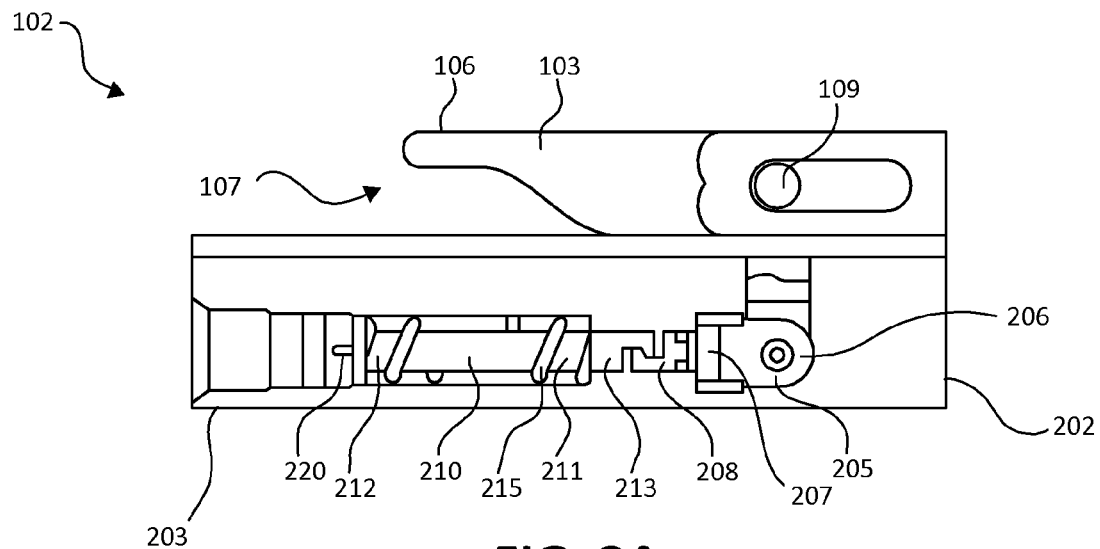
FIGS. 3A and 3B illustrate a mechanical activation device, in accordance with various embodiments.
Figure 3B:
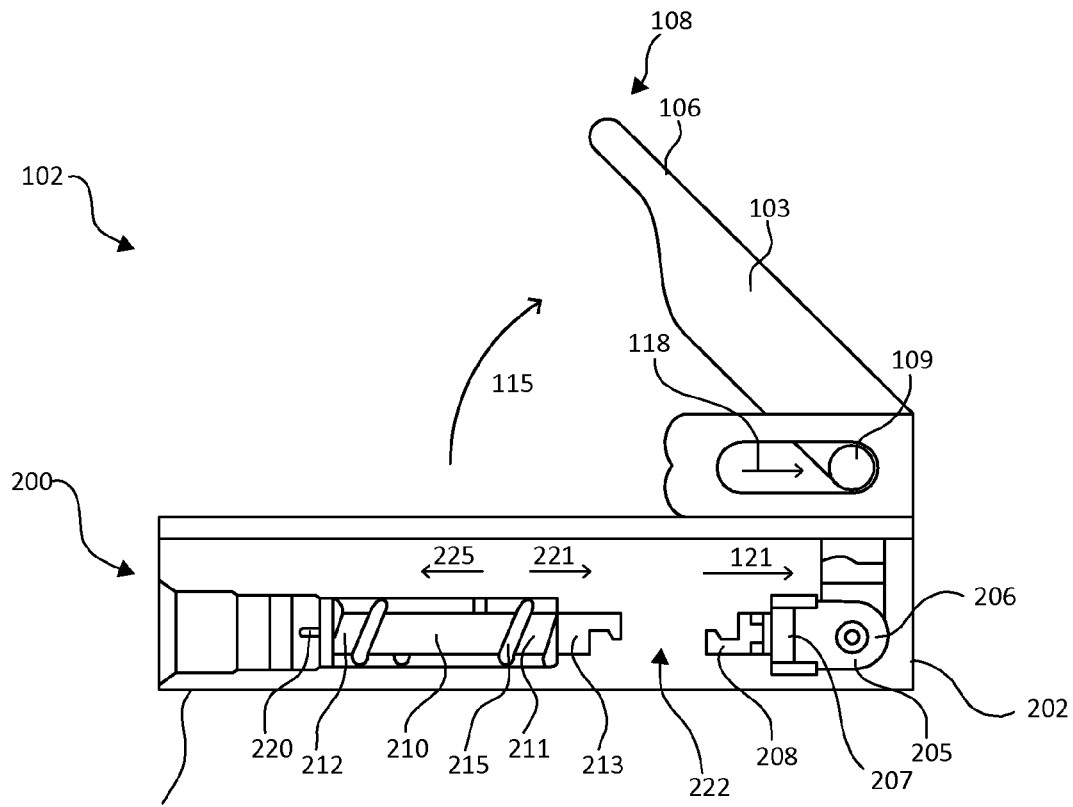

In various embodiments, the percussion actuator 200 is coupled to the hinge 109, or coupled to both the hinge 109 and the activation lever 103. With reference to FIG. 2, the percussion actuator 200 may comprise an outer shell 201, comprising an inbound end 202 and an outbound end 203. The outbound end 203 may comprise threading to receive an object having complementary threading. The outer shell 201 may be cylindrical, rectangular, or any other shape suitable to house the interior pieces. With reference to FIGS. 3A and 3B, the percussion actuator 200 may comprise interior pieces including an outer rod 205, an actuating rod 210, a spring 215, and a pin 220. The outer rod 205 may be contained within the outer shell 201 proximate to the inbound end 202 and may comprise an outer rod first end 206 and an outer rod second end 207. The outer rod second end 207 may comprise an outer rod hook 208. The outer rod first end 206 may be coupled to the hinge 109, or it may be coupled to the activation lever 103, or both the hinge 109 and the activation lever 103. With reference to FIGS. 2, 3A, and 3B, the outer rod 205 may move in a first cocking direction 121 in response to the hinge 109 moving in the actuating direction 118. The first cocking direction 121 may be the same direction or movement as the actuating direction 118, or the first cocking direction 121 and the actuating direction 118 may be different directions or movements.

With continued reference to FIGS. 3A and 3B, in various embodiments, the actuating rod 210 may comprise an actuating rod first end 211 and an actuating rod second end 212. The actuating rod first end 211 may comprise an actuating rod hook 213 that may have a shape complementary to the outer rod hook 208. The outer rod hook 208 and the actuating rod hook 213 may be removably coupled together by the linking of their complementary shapes. The outer rod hook 208 and the actuating rod hook 213 may also be removably coupled together in any other suitable fashion such as by a magnet or a fastener.

In various embodiments, in response to the outer rod 205 moving in the first cocking direction 121 with the hinge 109, the hinge 109 moving in the actuating direction 118, the outer rod 205 and the actuating rod 210 may remain coupled by the outer rod hook 208 and the actuating rod hook 213. The actuating rod 210 may move in a second cocking direction 221 in response to being coupled to the outer rod 205 as the outer rod 205 moves in the first cocking direction 121. The second cocking direction 221 may be the same direction or movement as first cocking direction 121, or the second cocking direction 221 and the first cocking direction 121 may be different directions or movements.

In various embodiments, a spring 215 may be coupled to the actuating rod 210. The spring 215 may be coiled around the actuating rod 210, coupled adjacent to or parallel to the actuating rod 210, or coupled to the actuating rod 210 in any other configuration suitable to store potential energy as the actuating rod 210 moves in the second cocking direction 221. Before the actuating rod 210 moves in the second cocking direction 221, the spring 215 is in a relaxed position. As the actuating rod 210 moves in the second cocking direction 221, the spring 215 compresses or expands, depending on the spring's 215 coupling arrangement to the actuating rod 210, and stores potential energy. In the exemplary embodiment shown in FIGS. 3A and 3B, the spring 215 compresses as the actuating rod 210 moves in the second cocking direction 221. The outer rod 205 and the actuating rod 210 may move in the first cocking direction 121 and the second cocking direction 221, respectively, until the outer rod 205 and the actuating rod 210 reach a sever point 222. At the sever point 222, the actuating rod hook 213 and the outer rod hook 208 may become decoupled, and the spring 215, which has stored potential energy, releases the potential energy into kinetic energy, moving the actuating rod 210 in a striking direction 225. The striking direction 225 may be in a direction opposite to the first cocking direction 121, or in a direction opposite the second cocking direction 221.

In various embodiments, the pin 220 may be coupled to the actuating rod second end 207, and may extend axially from the actuating rod second end 207. The pin 220 may comprise a substantially cylindrical shape, conical shape, or any other shape that would allow it to actuate the primer 300. The pin 220 may have a radius (or width depending on the shape of the pin 220) that is less than the radius (or width) of the actuating rod 210.

Figure 4:
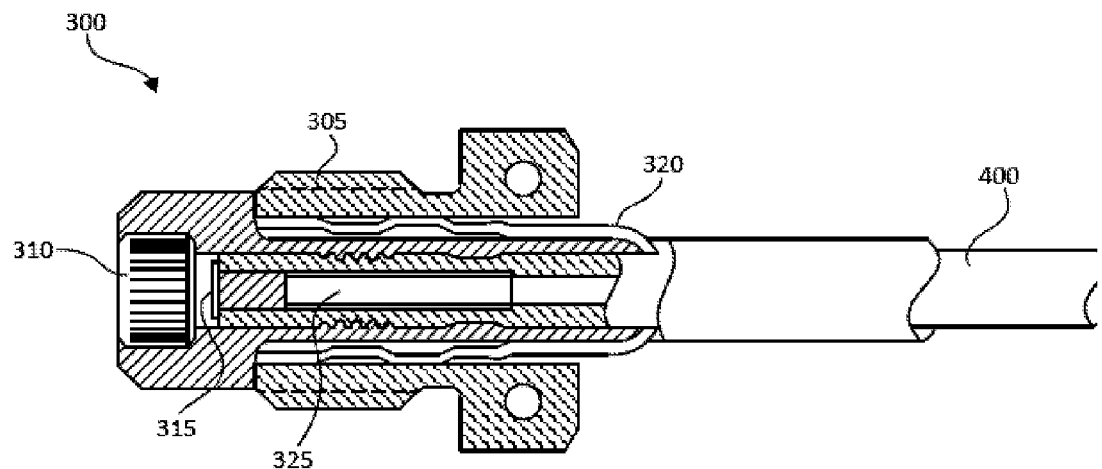
FIG. 4 illustrates an exemplary primer, in accordance with various embodiments.

In various embodiments, with momentary reference to FIG. 2, the primer 300 may be coupled to the outbound end 203, proximate to the actuating rod second end 212. In reference to FIG. 4, the primer 300 may comprise a housing 305, a receiving end 310, a cap 315 contained within the housing 305, a cord end 320, and an interior chamber 325 contained within the housing 305. The receiving end 310 may couple to the outbound end 203 of the percussion actuator 200. The receiving end 310 may comprise threading complementary to threading on the outbound end 203 of the percussion actuator 200, by which the primer 300 couples to the outbound end 203 of the percussion actuator 200. However, the primer 300 may couple to the percussion actuator 200 by any other suitable mechanism. The cap 315 may be comprised of a pressure-sensitive reactive material. The interior chamber 325 may contain therein any suitable pyrotechnic initiator material, for example, titanium-perchlorate.

Figure 5:
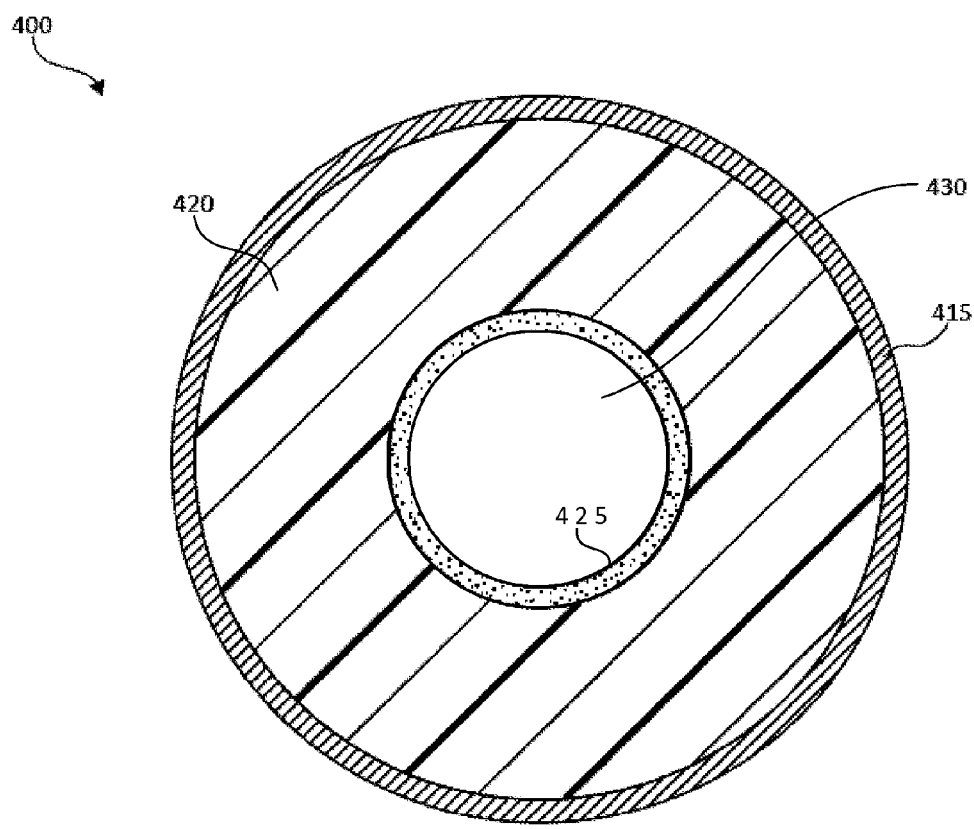
FIG. 5 illustrates a cross-section of an exemplary explosive cord, in accordance with various embodiments.

In reference to FIGS. 2 and 5, in various embodiments, the explosive cord 400 may be a low-energy fuse configured to transmit an explosive stimulus. For example, the explosive cord 400, upon detonation, may propagate a pressure wave and hot gas. The explosive cord 400 may comprise an explosive cord first end 405, an explosive cord second end 410, an outer portion 415, and an inner portion 420, an explosive cord reactive material 425, and a hollow core 430. With momentary reference to FIGS. 2 and 4, the explosive cord first end 405 may be coupled to the cord end 320. With reference to FIG. 5, the outer portion 415 may be comprised of any material that is suitable to provide abrasion protection and tensile strength along the length and circumference of the explosive cord 400, for example, stainless steel. The inner portion 420, located radially adjacent to the explosive cord outer portion 415 throughout the length and circumference of the explosive cord 400, is comprised of tubing made of plastic material, such as a fluoropolymer including polytetrafluoroethylene ("PTFE") and/or a copolymer of ethylene and chlorotrifluoroethylene such as that available commercially as HALAR, or other suitable material. The explosive cord reactive material 425 may be comprised of a pulverulent reactive material, and located radially adjacent to the inner portion 420 and spans the length and circumference of the explosive cord 400. The explosive cord reactive material 425 may be any material that is able to propagate a pressure wave and hot gas through a length of the explosive cord 400, causing a thin layer detonation through the hollow core 430 of the explosive cord 400. For example, the explosive cord reactive material may be a mixture of 75-90% nitroamine high explosive, for example, octogen (also known as HMX) and 10-25% metallic aluminum by weight. In various embodiments, a mixture of 80% HMX and 20% metallic aluminum is used.

Returning to FIG. 2, in various embodiments, the gas-generating device 450 is coupled to the explosive cord second end 410. Gas-generating device 450 may be any suitable device for generating significant amounts of gas in a short period of time once activated.

In various embodiments, the cap 315 may be struck by the pin 220, which moves with the actuating rod 210 in the striking direction 225. The cap 315, which may be comprised of pressure-sensitive explosive material, would then ignite upon pressure caused by the pin 220 striking it, activating the pyrotechnic initiator material contained in the interior chamber 325. The pyrotechnic initiator material contained in the interior chamber 325 would then deflagrate, igniting the explosive cord reactive material 425. The explosive cord reactive material 425 may then systematically detonate from the explosive cord first end 405 to the explosive cord second end 410, thereby propagating a pressure wave and hot gas to the explosive cord second end 410 where the gas-generating device 450 is located. The hot gas would activate the gas-generating device 450, which in turn, would generate gas.

Figure 6:
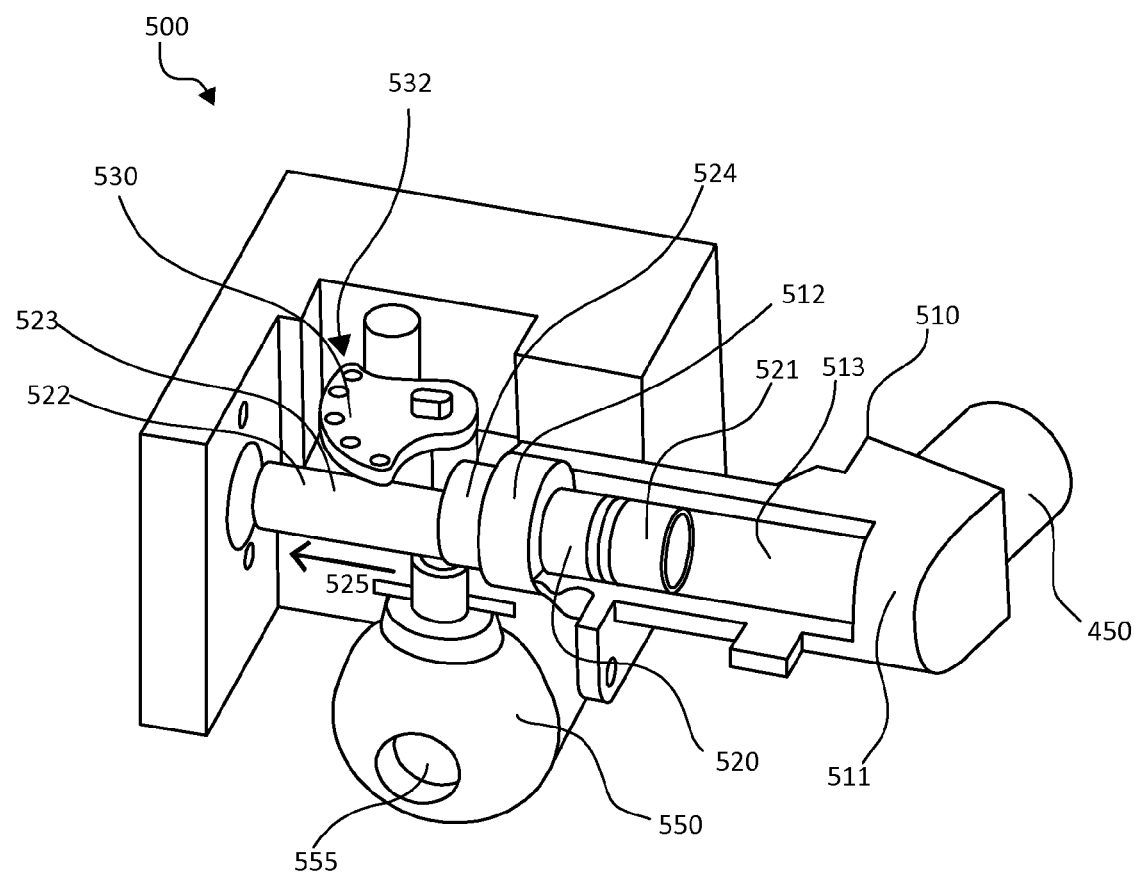
FIG. 6 illustrates an exemplary valve system, in accordance with various embodiments.

Turning to FIG. 6, in accordance with various embodiments, the valve actuation apparatus may comprise a valve system 500 coupled to the gas-generating device 450. The valve system 500 may comprise a pressure chamber 510, a piston 520, a valve lever 530, and a valve 550. The pressure chamber 510 may comprise a pressure chamber first end 511 coupled to the gas-generating device 450, a pressure chamber second end 512, and a pressure cavity 513 enclosed between the pressure chamber first end 511 and the pressure chamber second end 512. The pressure cavity 513 may be configured to receive and hold gas therein from the activated gas-generating device 450. As the gas-generating device 450 produces gas, the pressure cavity 513 receives the gas and gas pressure is increased.

In various embodiments, the piston 520 may be coupled to the pressure chamber second end 512. The piston 520 may comprise a cylindrical rod, but it may take the form of any other suitable shape. The piston 520 may comprise a piston first end 521 coupled to the pressure chamber second end 512, a piston second end 522, and a piston body 523 therebetween. The piston 520 may also comprise a shelf portion 524 protruding radially outward from the piston body 523. The piston 520 may be configured to translate along an axis in an opening direction 525 in response to the gas pressure created in the pressure cavity 513 by the gas-generating device 450.

In various embodiments, the valve lever 530 may be in a valve lever closed position and resting in a location proximate to the piston 520 before the piston 520 translates in the opening direction 525. The valve lever 530 may comprise any shape, such as a bell shape or handle shape, and the valve lever 530 may be configured to be rotated or translated from the valve lever closed position to a valve lever open position 532. Specifically, the valve lever 530 may be configured to shift from the valve lever closed position to the valve lever open position 532 as a result of the piston 520 translating in the opening direction 525. The valve lever 530 may be shifted from the valve lever closed position to the valve lever open position 532 by the piston 520, or by the shelf portion 524.

In various embodiments, the valve lever 530 may be coupled to the valve 550, and when the valve lever 530 moves from the valve lever closed position to the valve lever open position 532, the valve 550 opens to a valve open position 555 and allows air to flow through it. In various embodiments, the valve 550 may be positioned proximate to the piston 520, and the piston 520 translating in the opening direction 525 may directly move the valve 550 from a valve closed position to a valve open position 555. The valve 550 may be a ball valve or any other type of valve suitable for the present disclosure.

In various embodiments, the valve actuation apparatus may comprise an inflatable emergency evacuation slide coupled to the valve system 500. Specifically, the inflatable emergency evacuation slide may be coupled to the valve 550. The inflatable emergency evacuation slide remains deflated until it is inflated in response to the valve actuation apparatus being activated, the valve 550 moving into the valve open position 555, and gas being allowed to flow through the valve 550 and into the inflatable emergency evacuation slide, which inflates the inflatable emergency evacuation slide.

In various embodiments, activation of the valve actuation apparatus may comprise a user or a mechanical apparatus forcing the activation lever 103 in the arming direction 115 from the unarmed position 107 to the armed position 108, and forcing the activation lever 103 and the hinge 109 in the actuating direction 118. As a result of the activation lever 103 and the hinge 109 moving in the actuating direction 118, the outer rod 205 and actuating rod 210, removably coupled together, may move in the first cocking direction 121 and second cocking direction 221, respectively. As the actuating rod 210 moves in the second cocking direction 221, the spring 215 may compress or expand to store potential energy. In response to the outer rod 205 and the actuating rod 210 reaching the sever point 222, the outer rod 205 and the actuating rod 210 may decouple. In response to the decoupling of the outer rod 205 and the actuating rod 210, the potential energy stored by the spring 215 may be released into kinetic energy, which may move the actuating rod 210, along with the pin 220, in the striking direction 225. The pin 220 may strike the primer 300, which may deflagrate in response, and ignite the explosive cord reactive material 425. The ignited explosive cord reactive material 425 may detonate, propagating a pressure wave and hot gas through the explosive cord 400, and as a result, activate the gas-generating device 450. The gas-generating device 450 may generate gas, sending the gas into the pressure cavity 513 of the pressure chamber 510, increasing gas pressure therein. The gas pressure may cause the piston 520 to translate in the opening direction 525 and may move the valve lever 530 from a valve lever closed position to a valve lever open position 532. As a result, the valve 550 may be shifted from a valve closed position to a valve open position 555, allowing gas to flow through it, which may inflate the inflatable emergency evacuation slide. Because of the way that the valve actuation apparatus functions, no electricity is used to actuate the apparatus. Instead, it is actuated by mechanical force. Therefore, in various embodiments, no electrical power source, from an aircraft for example, is used, avoiding complex and/or expensive circuitry.

FIG. 7 depicts a block diagram of a method of actuating a valve actuation apparatus 700, in accordance with various embodiments. With combined reference to FIGS. 2 and 7, rotating activation lever 705 comprises rotating the activation lever 103 in the arming direction 115 from an unarmed position 107 to an armed position 108. Translating a hinge 710 comprises translating the hinge 109 coupled to the activation lever 103 in an actuating direction 118. Striking a primer 715 comprises actuating a percussion actuator 200 in response to the hinge 109 translating in the actuating direction 118, and the percussion actuator 200 striking the primer 300. With combined reference to FIGS. 2, 5, and 7, actuating an explosive cord 720 comprises the primer 300 deflagrating in response to being struck by the percussion actuator 200, actuating an explosive cord 400 by causing the explosive cord reactive material 425 to detonate. Actuating a gas-generating device 725 comprises a gas-generating device 450 being coupled to the explosive cord 400 and activating as a result of a pressure wave and hot gas from the detonation of the explosive cord reactive material 425. With combined reference to FIGS. 6 and 7, increasing gas pressure 725 comprises a pressure chamber 510 coupled to the gas-generating device 450, wherein gas generated by the gas-generating device 450 is stored in a pressure cavity 513, increasing the gas pressure therein. Translating a piston 735 comprises a piston 520 coupled to the pressure chamber 510 that translates along an axis in response to the gas pressure increase in the pressure cavity 513. Rotating a valve lever 740 comprises a valve lever 530 moving from a valve lever closed position to a valve lever open position 532 in response to the piston 520 translating along an axis. Inflating an emergency evacuation slide 745 comprises allowing gas to flow through an open valve 550 as a result of the valve lever 530 being moved to the valve lever open position 550, and the air filling an emergency evacuation slide coupled therewith.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may or may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A valve actuation apparatus, comprising:
   a mechanical activation device;
   a primer coupled to the mechanical activation device and configured to deflagrate upon activation by the mechanical activation device;
   an explosive cord, comprising an explosive cord first end coupled to the primer, an explosive cord second end, an outer portion, an inner portion, and an explosive cord reactive material, wherein the explosive cord reactive material is configured to detonate upon ignition from the primer and propagate a pressure wave and hot gas through a length of the explosive cord;
   a gas-generating device coupled to the explosive cord second end configured to be activated by the hot gas from the explosive cord and, in response to the hot gas, produce a gas; and
   a valve coupled to the gas-generating device, wherein the valve is configured to move from a valve closed position to a valve open position in response to the gas.

2. The valve actuation apparatus of claim 1, wherein the mechanical activation device comprises:
   an activation lever;
   a hinge coupled to the activation lever; and
   a percussion actuator coupled to the hinge.

3. The valve actuation apparatus of claim 2, wherein:
   the activation lever is in an unarmed position and configured to move about the hinge in a first direction to an armed position;
   the hinge is configured to move in a second direction once the activation lever is in the armed position; and
   the percussion actuator is configured to activate the primer.

4. The valve actuation apparatus of claim 3, wherein the percussion actuator comprises:
   an outer shell comprising an inbound end and an outbound end;
   an outer rod coupled to the inbound end, comprising an outer rod first end coupled to the hinge and an outer rod second end, the outer rod being configured to move in a third direction when the hinge moves in the second direction;
   an actuating rod contained within the outer shell, comprising an actuating rod first end removably coupled to the outer rod second end, and an actuating rod second end, the actuating rod being configured to move with the outer rod in the third direction to a sever point, and at the sever point the actuating rod is configured to decouple from the outer rod;
   a spring coupled to the actuating rod, the spring being configured to store potential energy as the actuating rod moves in the third direction, and at the sever point, release the stored potential energy into kinetic energy in a fourth direction, which moves the actuating rod in the fourth direction; and
   a pin coupled to the actuating rod second end configured to strike and activate the primer.

5. The valve actuation apparatus of claim 4, wherein the second direction and the third direction are the same.

6. The valve actuation apparatus of claim 4, wherein the third direction and the fourth direction are opposite each other.

7. The valve actuation apparatus of claim 4, wherein the actuating rod first end comprises an actuating rod hook, and the outer rod second end comprises an outer rod hook complementary to the actuating rod hook, and the actuating rod first end and the outer rod second end are removably coupled by linking of the outer rod hook and the actuating rod hook.

8. The valve actuation apparatus of claim 3, wherein the first direction is a rotational direction.

9. The valve actuation apparatus of claim 1, wherein the explosive cord reactive material comprises a mixture of 80% HMX and 20% metallic aluminum by weight.

10. The valve actuation apparatus of claim 1, wherein the valve is a ball valve.

11. The valve actuation apparatus of claim 1, further comprising an inflatable emergency evacuation slide for an aircraft coupled to the valve, wherein the inflatable emergency evacuation slide is inflated in response to the valve moving into the valve open position.

12. A valve actuation apparatus, comprising:
    a valve system activation apparatus, comprising:
      a mechanical activation device; and
      a gas-generating device coupled to the mechanical activation device and configured to produce a gas when activated; and
    a valve system coupled to the gas-generating device, comprising:
      a pressure chamber comprising a pressure chamber first end coupled to the gas-generating device, a pressure chamber second end, and a pressure cavity therebetween configured to receive and hold the gas produced by the gas-generating device, creating a gas pressure;
      a piston, configured to translate along an axis in response to the gas pressure in the pressure cavity, comprising a piston first end coupled to the pressure chamber second end, a piston second end, and a piston body therebetween;
      a valve lever in a valve lever closed position proximate to the piston, the valve lever being configured to be moved into a valve lever open position by the piston as the piston translates along the axis in response to the gas pressure; and
      a valve coupled to the valve lever.

13. The valve actuation apparatus of claim 12, wherein the piston further comprises a shelf portion protruding outwardly from the piston body, wherein the valve lever is pushed from the valve lever closed position to the valve lever open position by the shelf portion.

14. The valve actuation apparatus of claim 12, wherein the valve system activation apparatus further comprises an explosive cord coupled to the gas-generating device between the mechanical activation device and the gas-generating device, wherein the explosive cord comprises an explosive cord reactive material.

15. The valve actuation apparatus of claim 14, wherein the explosive cord reactive material comprises a mixture of 80% HMX and 20% metallic aluminum by weight.

16. The valve actuation apparatus of claim 12, wherein the valve is a ball valve.

17. The valve actuation apparatus of claim 12, further comprising an inflatable emergency evacuation slide for an aircraft coupled to the valve, wherein the inflatable emergency evacuation slide is inflated in response to the valve lever moving into the valve lever open position.

18. A method of actuating a valve actuation apparatus, comprising:
- rotating an activation lever coupled to a hinge in a first direction from an unarmed position to an armed position; and
- translating the hinge in a second direction;
- striking a primer with a percussion actuator in response to the hinge translating in the second direction, wherein the primer deflagrates in response to the striking;
- actuating an explosive cord in response to the primer deflagration;
- actuating a gas-generating device in response to actuation of the explosive cord;
- increasing a gas pressure in a pressure cavity of a pressure chamber as the gas-generating device produces a gas:
- translating a piston along an axis in response to the gas pressure, the piston being coupled to the pressure chamber: and
- rotating a valve lever from a valve lever closed position to a valve lever open position in response to the translating.

19. The method of actuating a valve actuation apparatus of claim 18, further comprising inflating an inflatable emergency evacuation slide for an aircraft in response to the valve lever rotation to the open position.

* * * * *